US008055879B2

(12) United States Patent
Archer et al.

(10) Patent No.: US 8,055,879 B2
(45) Date of Patent: *Nov. 8, 2011

(54) TRACKING NETWORK CONTENTION (75) Inventors: Charles J. Archer, Rochester, MN (US);
Amanda Peters, Rochester, MN (US);
Brian E. Smith, Rochester, MN (US);
Brent A. Swartz, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/955,474

(22) Filed: Dec. 13, 2007

(65) Prior Publication Data
US 2009/0154486 A1    Jun. 18, 2009

(51) Int. Cl.
*H04L 12/28* (2006.01)
*G06F 15/16* (2006.01)
*G06F 15/00* (2006.01)

(52) U.S. Cl. ............................ 712/10; 709/232; 370/406

(58) Field of Classification Search .................. 370/241, 370/242, 245, 251, 252, 400; 712/23, 200, 712/207, 10, 32; 717/4, 5, 6, 8, 9
See application file for complete search history.

(56) References Cited

U.S. PATENT DOCUMENTS

| | | | |
|---|---|---|---|
| 5,050,162 A | 9/1991 | Golestani | |
| 5,193,179 A * | 3/1993 | Laprade et al. | 714/47 |
| 5,218,676 A | 6/1993 | Ben-Ayed et al. | |
| 5,319,638 A | 6/1994 | Lin | |
| 5,347,450 A | 9/1994 | Nugent | |
| 5,453,978 A | 9/1995 | Sethu et al. | |
| 5,835,482 A | 11/1998 | Allen | |
| 5,933,425 A | 8/1999 | Iwata | |
| 5,959,995 A | 9/1999 | Wicki et al. | |
| 5,995,503 A | 11/1999 | Crawley et al. | |
| 6,081,506 A | 6/2000 | Buyukkoc et al. | |
| 6,486,983 B1 | 11/2002 | Beshai et al. | |
| 6,748,413 B1 | 6/2004 | Bournas | |
| 6,901,052 B2 | 5/2005 | Buskirk et al. | |
| 7,319,695 B1 | 1/2008 | Agarwal et al. | |
| 7,406,086 B2 * | 7/2008 | Deneroff et al. | 370/400 |
| 7,552,312 B2 * | 6/2009 | Archer et al. | 712/32 |

(Continued)

OTHER PUBLICATIONS

Ribler et al., "The Autopilot performance-directed adaptive control system," Future Generations Computer Systems, Elsevier Science Publishers, Amsterdam, NL, vol. 18, No. 1, Sep. 1, 2001, pp. 175-187.

(Continued)

*Primary Examiner* — Hanh Nguyen
(74) *Attorney, Agent, or Firm* — Biggers & Ohanian, LLP; James R. Nock (57) ABSTRACT

Methods, apparatus, and product for tracking network contention on links among compute nodes of an operational group in a point-to-point data communications network of a parallel computer are disclosed. In embodiments of the present invention, each compute node is connected to an adjacent compute node in the point-to-point data communications network through a link. Tracking network contention according to embodiments of the present invention includes maintaining, by a network contention module on each compute node in the operational group, a local contention counter for each compute node, each local contention counter representing network contention on links among the compute nodes originating from the compute node; and maintaining a global contention counter, the global contention counter representing network contention currently on all links among the compute nodes in the operational group.

7 Claims, 7 Drawing Sheets

U.S. PATENT DOCUMENTS

| | | | |
|---|---|---|---|
| 2004/0001508 | A1 | 1/2004 | Zheng et al. |
| 2005/0002334 | A1 | 1/2005 | Chao et al. |
| 2005/0018682 | A1 | 1/2005 | Ferguson et al. |
| 2005/0068946 | A1 | 3/2005 | Beshai |
| 2005/0100035 | A1 | 5/2005 | Chiou et al. |
| 2005/0108425 | A1 | 5/2005 | Rabinovitch |
| 2006/0002424 | A1 | 1/2006 | Gadde |
| 2006/0195336 | A1 | 8/2006 | Greven et al. |
| 2007/0198519 | A1* | 8/2007 | Dice et al. .................. 707/8 |
| 2008/0016249 | A1 | 1/2008 | Ellis et al. |
| 2009/0248894 | A1* | 10/2009 | Archer et al. ............. 709/241 |
| 2009/0248895 | A1* | 10/2009 | Archer et al. ............. 709/241 |

OTHER PUBLICATIONS

Zhang et al., "Automatic Performance Tuning for J2EE Application Server Systems," Lecture Notes in Computer Science, vol. 3806, 2005, pp. 520-527.

Chung et al., "Automated Cluster-Based Web Service Performance Tuning," High Performance Distributed Computing, 2004, Proceedings of the 13th IEEE International Symposium on Honolulu, HI, USA, Jun. 4-6, 2004, Piscataway, NJ, USA, IEEE, Jun. 4, 2004, pp. 36-44.

Hondroudakis et al., "An Empirically Derived Framework for Classifying Parallel Program Performance Tuning Problems," Proceedings of the Sigmetrics Symposium on Parallel and Distributed Tools, SPDT 1998, Welches, OR, Aug. 3-4, 1998, Sigmetrics Symposium on Parallel and Distributed Tools, New York, NY, US, ACM, vol. SYMP 2, Aug. 3, 1998, pp. 112-123.

Gara et al., "Overview of the Blue Gene/L system architecture," IBM Journal of Research & Development, vol. 49, No. 2/3, Mar./May 2005, pp. 195-211.

Adiga et al., "Blue Gene/L torus interconnection network," IBM Journal of Research & Development, vol. 49, No. 2/3, Mar./May 2005, pp. 265-276.

Barnett et al., "Broadcasting on Meshes with Worm-Hole Routing," Second Revised Version, Dec. 1995.

* cited by examiner

TRACKING NETWORK CONTENTION

BACKGROUND OF THE INVENTION

1. Field of the Invention

The field of the invention is data processing, or, more specifically, methods, apparatus, and products for tracking network contention.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm. Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

During execution of an application in a parallel computer, compute nodes connected by a torus may pass many data communications messages. Any delay in data communications increases inefficiency in executing the application. There currently exists several typical methods of routing data communications among compute nodes to reduce delay. Such methods typically rely on a predetermined set of routing rules or historical network congestion patterns to determine data communication routes among compute nodes. Rules and historical network congestion patterns, however, may not accurately reflect actual network congestion between nodes in the parallel computer and therefore may not reduce delay in data communications. Readers of skill in the art will recognize therefore that there exists a need to track network contention among compute nodes.

SUMMARY OF THE INVENTION

Methods, apparatus, and product for tracking network contention on links among compute nodes of an operational group in a point-to-point data communications network of a parallel computer are disclosed. In embodiments of the present invention, each compute node is connected to an adjacent compute node in the point-to-point data communications network through a link. Tracking network contention according to embodiments of the present invention includes maintaining, by a network contention module on each compute node in the operational group, a local contention counter for each compute node, each local contention counter representing network contention on links among the compute nodes originating from the compute node; and maintaining a global contention counter, the global contention counter representing network contention currently on all links among the compute nodes in the operational group.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
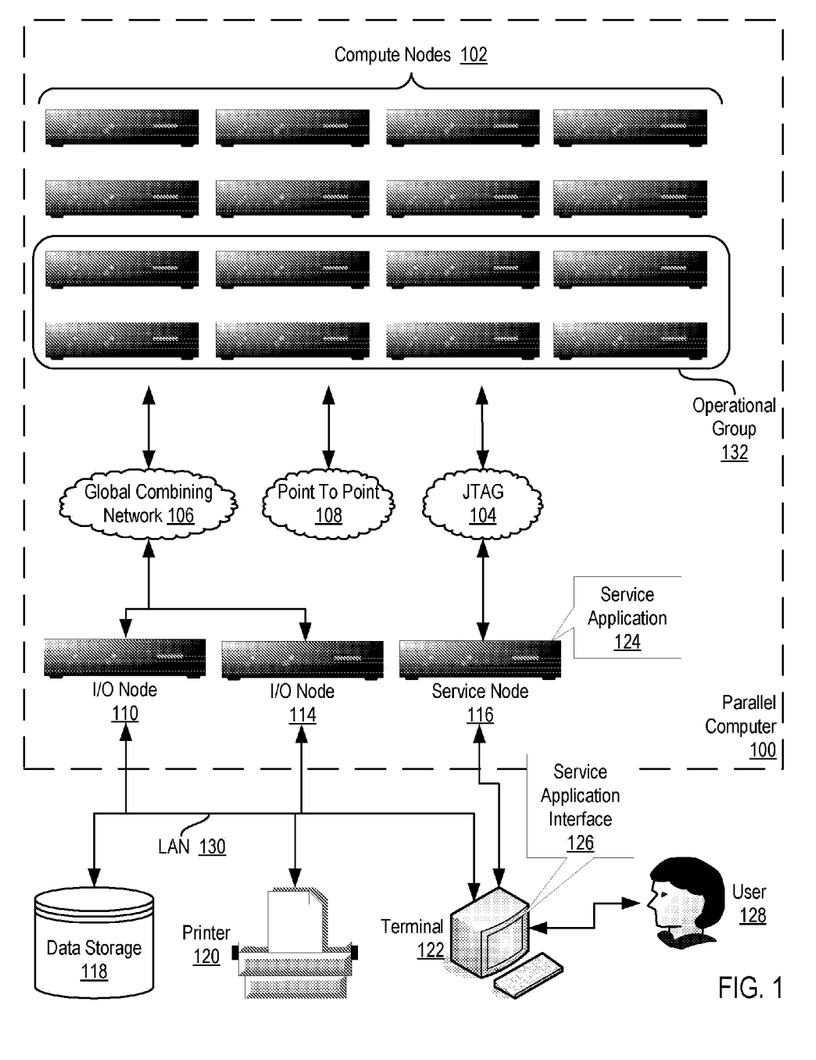
FIG. 1 illustrates an exemplary system for tracking network contention according to embodiments of the present invention.

Exemplary methods, apparatus, and products for tracking network contention in accordance with embodiments of the present invention are described with reference to the accompanying drawings, beginning with FIG. 1. FIG. 1 illustrates an exemplary system for tracking network contention according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for tracking network contention on links among compute nodes of an operational group in a point-to-point data communications network of a parallel computer according to embodiments of the present invention. In the system of FIG. 1, each compute node is connected to an adjacent compute node in the point-to-point data communications network (108) through a link. Network contention is congestion of data communications among nodes in a parallel computer. Each compute node in the system of FIG. 1 includes a network buffer that stores data communications for transmission on a link a neighboring compute node. Data communications stored for transmission in a buffer are delayed until transmitted.

To decrease the delay caused by network contention in typical parallel computers, various network routing schemes may be used. Such network routing schemes may include deterministic routing or adaptive routing. Deterministic routing is a routing technique in which the route between a pair of nodes is determined in advance of transmission. In the system of FIG. 1, for example, in the point-to-point data communications network, the route between a pair of nodes may be predetermined based on rules specifying that the transmission be routed first along the x axis, then along the y axis, then along the z axis. In this way, all data communication routes between compute nodes may be known precisely in advance of transmission.

Adaptive routing is a routing technique in which routes may be altered during data transmission in response to changes in system conditions. In typical point-to-point data communications networks, for example, adaptive routing may alter a data communications path at each compute node in dependence upon the network buffer of the compute node to select a link of the compute node having the lowest network congestion. Current routing schemes, however, typically rely on historical network congestion data in routing network traffic not current network congestion data. Moreover, typical routing schemes, such as the adaptive routing scheme, do not have access to a global view of network congestion in the parallel computer, but rather, only a local view of a single node's network congestion.

The system of FIG. 1 operates generally for tracking network contention on links among compute nodes of an operational group in a point-to-point data communications network of a parallel computer according to embodiments of the present invention by maintaining, by a network contention module on each compute node in the operational group, a local contention counter for each compute node, each local contention counter representing network contention on links among the compute nodes originating from the compute node. A local contention counter represents network contention on links among the compute nodes originating from the compute node. A local contention counter may defined as an array. Consider, for example, that the compute nodes in the system of FIG. 1 are configured in a torus network having locations defined by x, y, z coordinates as described above. In such a torus network a local contention counter for a compute node may be an array associating a link direction and a node location. That is, a local contention counter may defined as the following array:

LocalContentionCounter
  [{link_direction}{compute_node_location}]

In the example of a torus network, a link direction may be x+, x−, y+, y−, z+, and z−, represented in the local contention counter array as 0, 1, 2, 3, 4, and 5 respectively. A compute node at location 0,0,0 that transmits five packets to a compute node located at 3,0,0, on a route including only the x+ axis, may have a local contention counter that includes the following elements, assuming no other packets have been transmitted by the node located at 0,0,0:

LocalContentionCounter[0,0,0,0]=5
LocalContentionCounter[0,1,0,0]=5
LocalContentionCounter[0,2,0,0]=5

Each of the elements of the above exemplary local contention counter represent packets transmitted on x+ links of compute nodes. The first element listed above represents that 5 packets are transmitted on the x+ link of the node located at 0,0,0. The second element listed above represents that 5 packets are transmitted on the x+ link of the node located at 1,0,0. The third element listed above represents that 5 packets are transmitted on the x+ link of the node located at 2,0,0. Although only three elements of a local contention counter are described here, readers of skill in the art will recognize that such an array may include an element for each link of each direction of each compute node in the operational group.

The system of FIG. 1 also operates for tracking network contention on links among compute nodes of an operational group in a point-to-point data communications network of a parallel computer according to embodiments of the present invention by maintaining a global contention counter. A global contention counter represents network contention currently on all links among the compute nodes in the operational group. That is, a global contention counter is a mathematical combination of all values of each element of all local contention counters in the operational group.

The arrangement of nodes, networks, and I/O devices making up the exemplary system illustrated in FIG. 1 are for explanation only, not for limitation of the present invention. Data processing systems capable of tracking network contention according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of tracking network contention according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Tracking network contention according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of tracking network contention according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Figure 2:
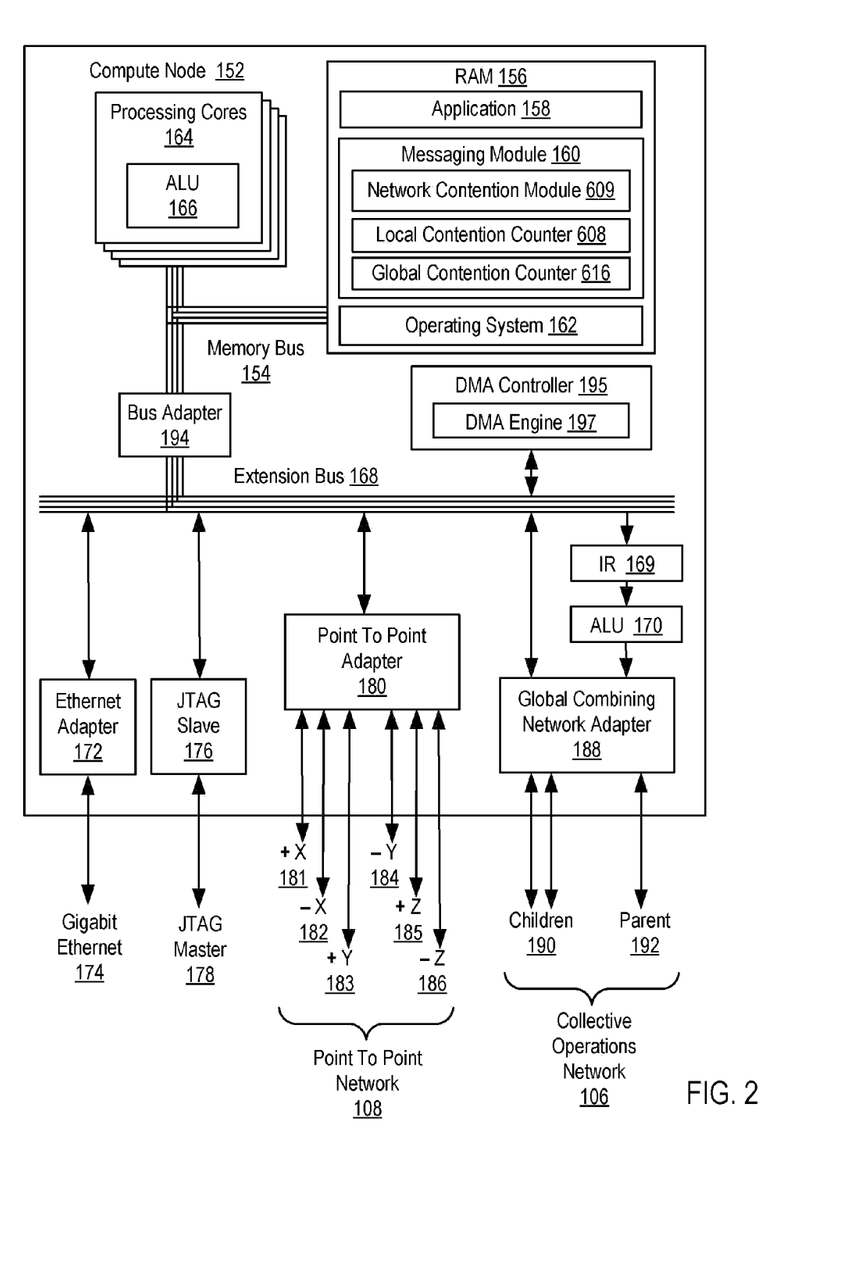
FIG. 2 sets forth a block diagram of an exemplary compute node useful in a parallel computer capable of tracking network contention according to embodiments of the present invention.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

The messaging module (160) of FIG. 2 also includes a network contention module (609), a module of computer program instructions for tracking network contention on links among compute nodes of an operational group in a point-to-point data communications network of a parallel computer in accordance with embodiments of the present invention. The network contention module (609) is capable of tracking network contention by maintaining a local contention counter (608) and maintaining a global contention counter (616), the global contention counter representing network contention currently on all links among the compute nodes in the operational group. The network contention module (609) of FIG. 2 is described as part of the messaging module (160) for clarity not for limitation. Readers of skill in the art will recognize that a network contention module (609) for tracking network contention among compute nodes may be a stand-alone application in RAM (156), may be included in an application (158), or may be included as firmware in the point-to-point adapter (180).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for tracking network contention according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in tracking network contention according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
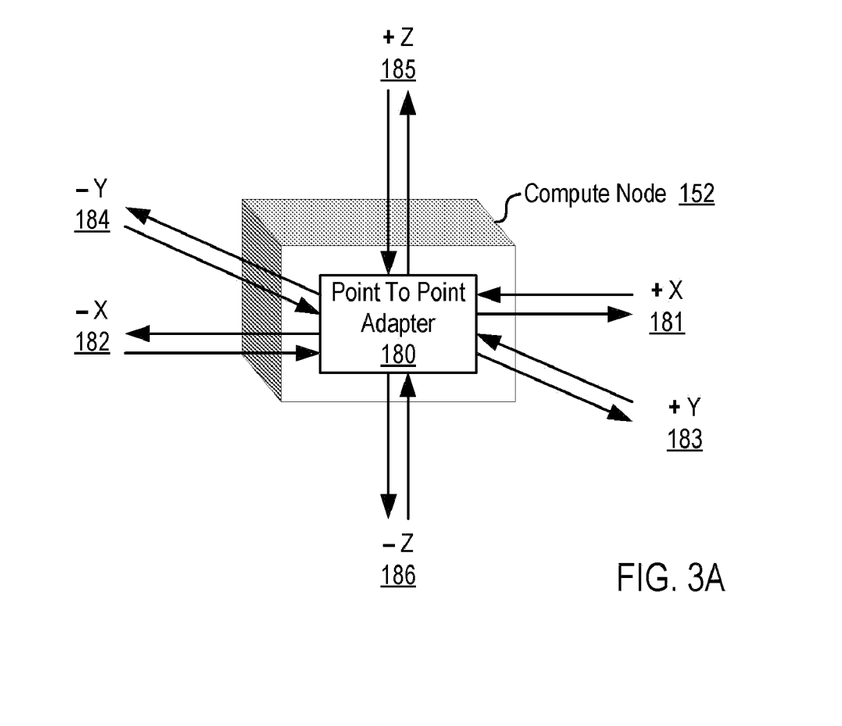
FIG. 3A illustrates an exemplary Point To Point Adapter useful in systems capable of tracking network contention according to embodiments of the present invention.

For further explanation, FIG. 3A illustrates an exemplary Point To Point Adapter (180) useful in systems capable of tracking network contention according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
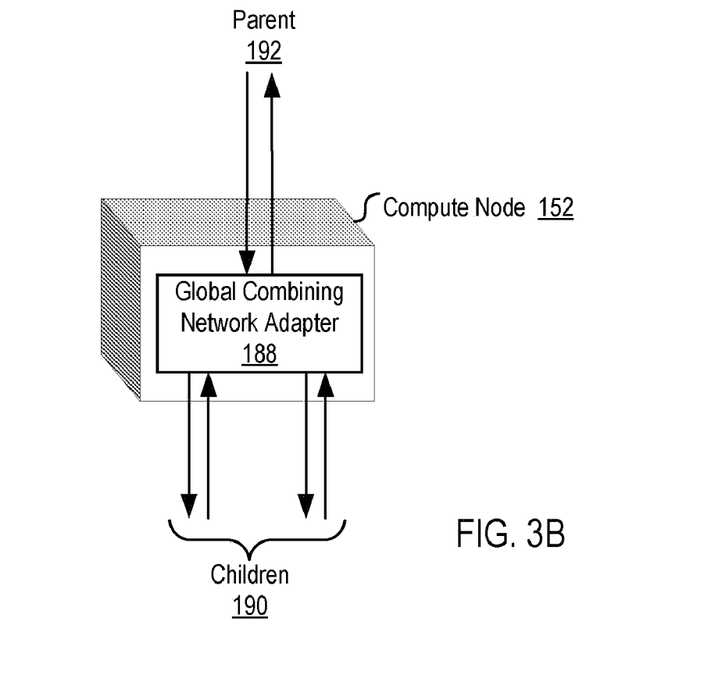
FIG. 3B illustrates an exemplary Global Combining Network Adapter useful in systems capable of tracking network contention according to embodiments of the present invention.

For further explanation, FIG. 3B illustrates an exemplary Global Combining Network Adapter (188) useful in systems capable of tracking network contention network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
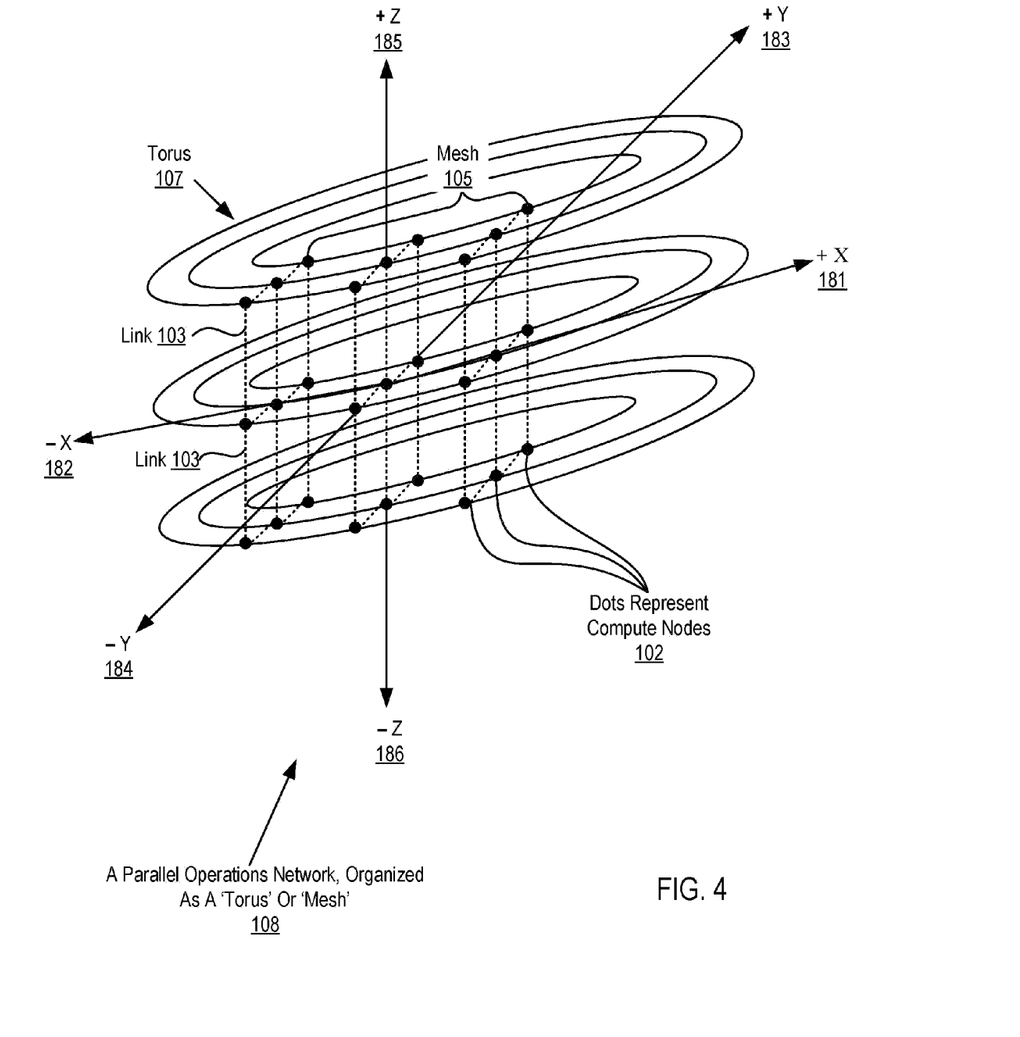
FIG. 4 sets forth a line drawing illustrating an exemplary data communications network optimized for point to point operations useful in systems capable of tracking network contention in accordance with embodiments of the present invention.

For further explanation, FIG. 4 sets forth a line drawing illustrating an exemplary data communications network (108) optimized for point to point operations useful in systems capable of tracking network contention in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in tracking network contention in accordance with embodiments of the present invention may contain only a few compute nodes or may contain thousands of compute nodes.

Figure 5:
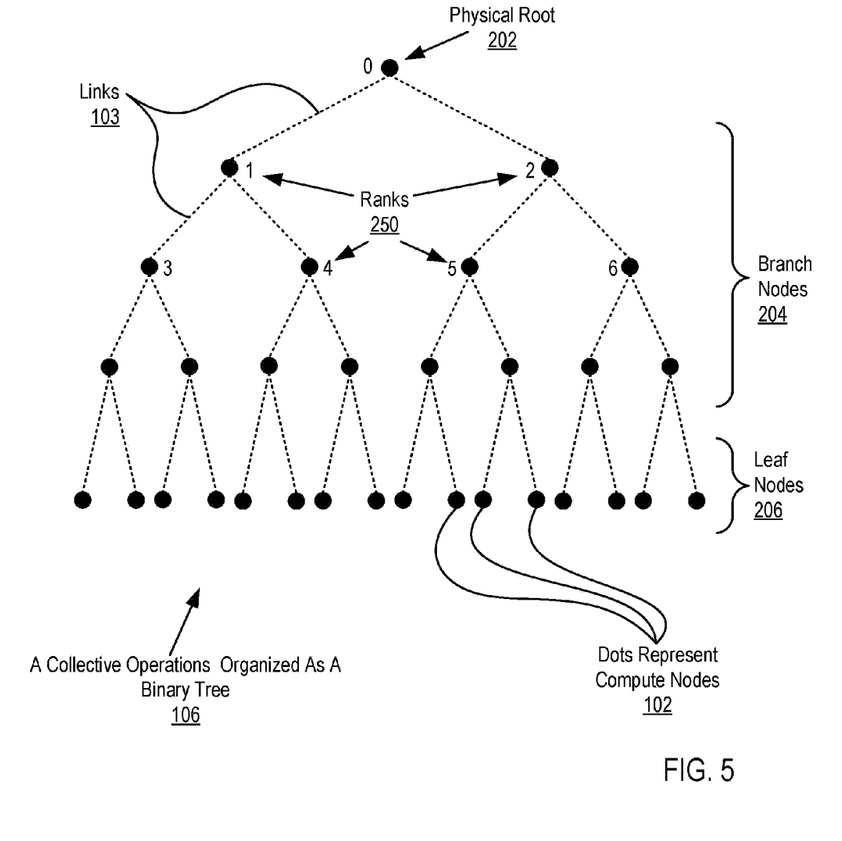
FIG. 5 sets forth a line drawing illustrating an exemplary data communications network optimized for collective operations useful in systems capable of tracking network contention in accordance with embodiments of the present invention.

For further explanation, FIG. 5 sets forth a line drawing illustrating an exemplary data communications network (106) optimized for collective operations useful in systems capable of tracking network contention in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for tracking network contention in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
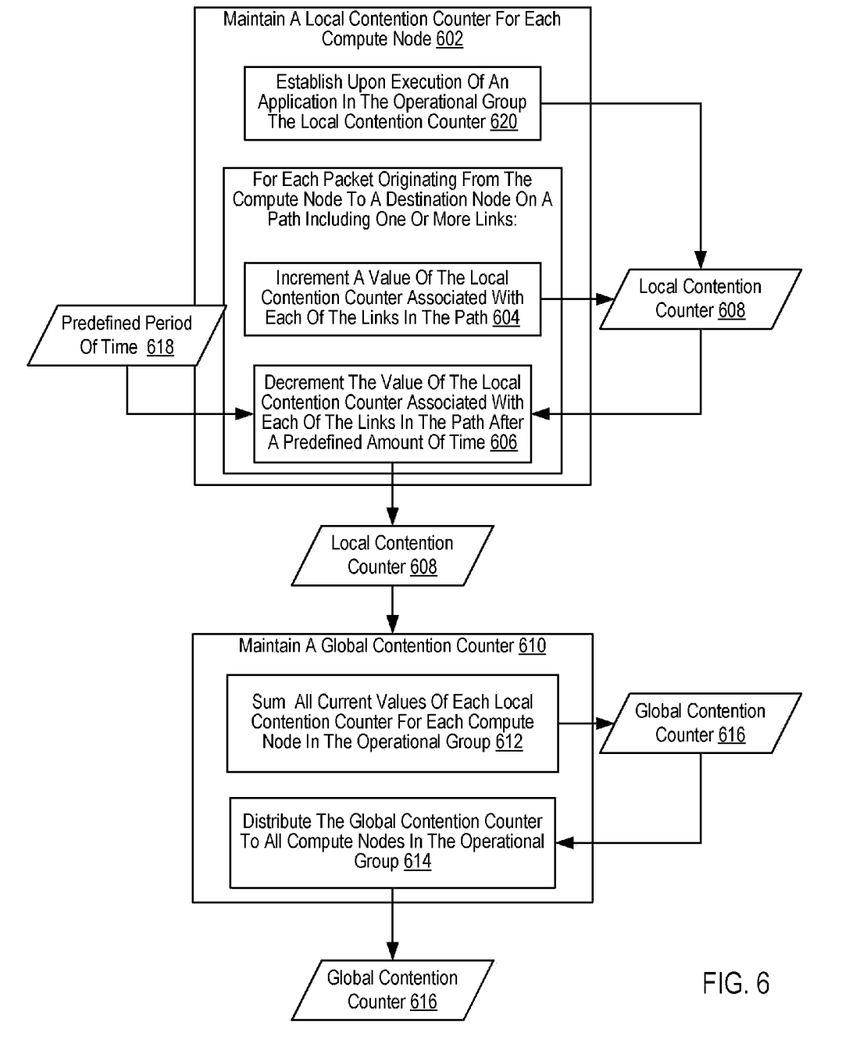
FIG. 6 sets forth a flow chart illustrating an exemplary method for tracking network contention on links among compute nodes of an operational group in a point-to-point data communications network of a parallel computer according to embodiments of the present invention.

For further explanation, FIG. 6 sets forth a flow chart illustrating an exemplary method for tracking network contention on links among compute nodes of an operational group in a point-to-point data communications network of a parallel computer according to embodiments of the present invention. In the method of FIG. 6, each compute node is connected to an adjacent compute node in the point-to-point data communications network through a link.

The method of FIG. 6 includes maintaining (602), by a network contention module on each compute node in the operational group, a local contention counter (608) for each compute node. In the method of FIG. 6, each local contention counter (608) represents network contention on links among the compute nodes originating from the compute node. In the method of FIG. 6 maintaining (602) a local contention counter (608) for each compute node includes establishing (620) upon execution of an application in the operational group the local contention counter (608) for links of each compute node in the operational group. Establishing (620) the local contention counter for each compute node may be carried out by initializing values of the local contention counter for each compute node to zero.

For each packet originating from the compute node to a destination node on a path including one or more links in the method of FIG. 6, maintaining (602) a local contention counter (608) may be carried out by incrementing (604) a value of the local contention counter (608) associated with each of the links in the path and decrementing (606) the value of the local contention counter (608) associated with each of the links in the path after a predefined amount of time. A packet may be any type of data communications transferred between a compute node and a destination node in an operational group of a parallel computer. Typically a packet is a data communications message.

The predefined amount of time (618) typically represents the amount of time required for a packet injected onto a link to cross the link. The amount of time may be expressed in terms of milliseconds, clock cycles, instructions or in any other way as will occur to those of skill in the art. After a packet crosses a link, the packet is no longer adding to network contention on that link. Either values associated with every link in the path may decremented simultaneously or values associated with only particular links in the path may be decremented at particular times. To more accurately reflect network contention, values associated with links closer to the originating compute node may be decremented at a time before decrementing values associated with links closer to the destination node. If a compute node sends a message traveling on a path of ten links to a destination node, the value associated with the first link in the path may be decremented before the value associated with the tenth link in the path.

The method of FIG. 6 also includes maintaining (610) a global contention counter (616), the global contention counter (616) representing network contention currently on all links among the compute nodes in the operational group. In the method of FIG. 6 maintaining (610) a global contention counter (616) may be carried out by summing (612), in the global contention counter (616), all current values of each local contention counter (608) for each compute node in the operational group; and distributing (614) the global contention counter (616) to all compute nodes in the operational group. Summing (612) all current values of each local contention counter and distributing the summed values in the global contention counter to all compute nodes may be carried out in various ways such as, for example, by performing an allreduce operation on a tree network which the compute nodes in the operational group are a part. An allreduce operation is a many-to-many collective operation that includes an arithmetic or logical function performed on several data elements. In this case an allreduce operation includes a summing arithmetic function. In this allreduce operation data elements form corresponding send buffer locations in the local contention counters are summed pair-wise to yield a single corresponding element in a root process's receive buffer. The single corresponding element is an element in the global contention counter. Upon completion of summing of each of the corresponding elements in the each of the local contention counters at the root process, the root process broadcasts the global contention counter to all compute nodes in the operational group. Consider the following as an example a node at location 0,0,0 transmits five packets to a node located at 3,0,0, on a path only on the x+ axis. The node at location 0,0,0 has a local contention counter that includes the following elements, assuming no other packets have been transmitted by the node located at 0,0,0:

LocalContentionCounter[0,0,0,0]=5
LocalContentionCounter[0,1,0,0]=5
LocalContentionCounter[0,2,0,0]=5

Consider also that a node at location 1,0,0 transmits three packets to the same node located at 3,0,0 on a path only on the x+ axis. The node at location 1,0,0 will have a local contention counter that includes the following elements:

LocalContentionCounter[0,1,0,0]=3
LocalContentionCounter[0,2,0,0]=3

At a predefined period of time, a root process on the compute node located at 0,0,0 performs an allreduce operation summing the two local contention counters. After the summing, the root process broadcasts to all compute nodes in the operational group the global contention counter that includes the following elements:

GlobalContentionCounter[0,0,0,0]=5
GlobalContentionCounter[0,1,0,0]=8
GlobalContentionCounter[0,2,0,0]=8

Each compute node now has a global as well as local view of the network contention among all compute nodes in the operational group. Such a global view of network contention, either alone or in combination with a compute node's local contention counter, may be used in determining routes for network traffic.

Figure 7:
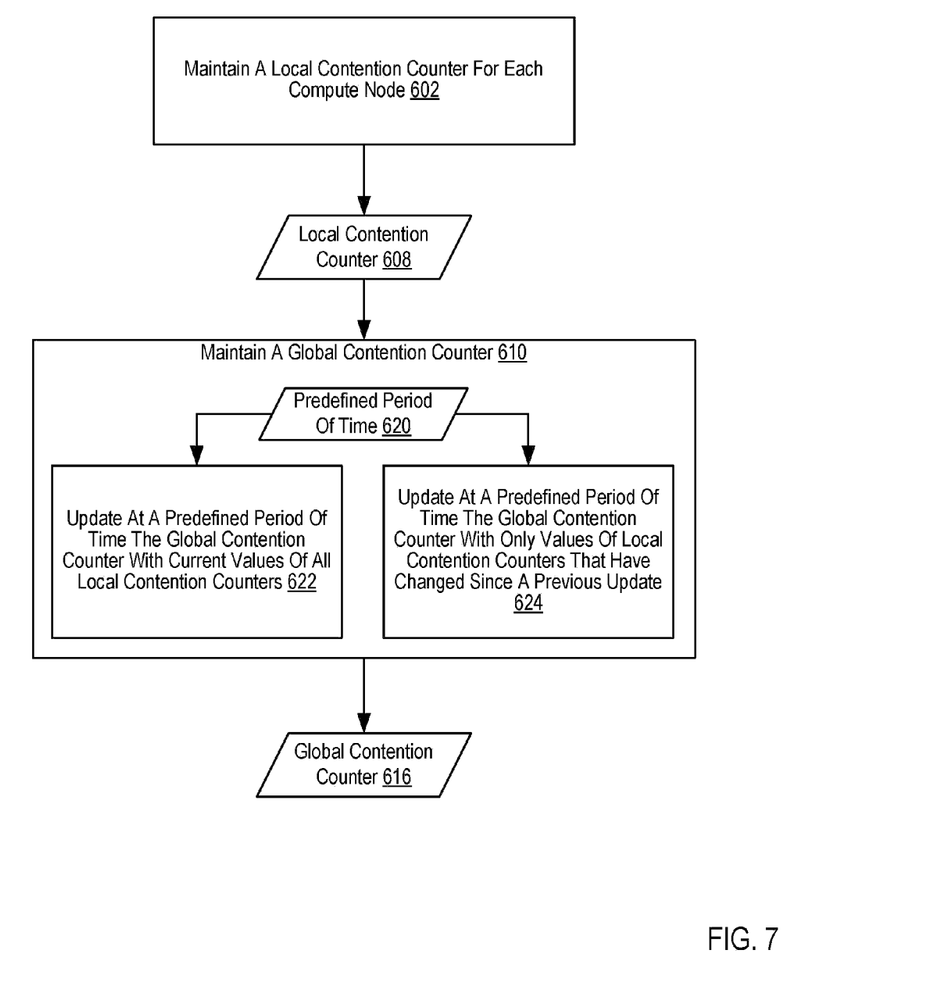
FIG. 7 sets forth a flow chart illustrating a further exemplary method for tracking network contention on links among compute nodes of an operational group in a point-to-point data communications network of a parallel computer according to embodiments of the present invention according to embodiments of the present invention.

For further explanation, FIG. 7 sets forth a flow chart illustrating a further exemplary method for tracking network contention on links among compute nodes of an operational group in a point-to-point data communications network of a parallel computer according to embodiments of the present invention according to embodiments of the present invention. The method of FIG. 7 is similar to the method of FIG. 6 in that the method of FIG. 7 also includes maintaining (602) a local contention counter (608) for each compute node and maintaining (610) a global contention counter (616).

The method of FIG. 7 differs from the method of FIG. 6, however, in that in the method of FIG. 7 maintaining (610) a global contention counter (616) includes two methods of updating the global contention counter. Maintaining (610) a global contention counter may include, for example, updating (622) at a predefined period of time (620) the global contention counter (616) with current values of all local contention counters (608). Updating (622) the global contention counter may be carried out by performing an allreduce operation, summing all values of all local contention counters among the compute nodes.

The predefined period of time (620) is a periodic 'heartbeat' upon which the global contention counter is updated. The amount of time between heartbeats may be specified by a user. The user may determine the amount of time between heartbeats in dependence upon the desired accuracy of the global contention counter in reflecting current network contention among the compute nodes and the computational overhead required to update the global contention counter. That is, the shorter the period of time between heartbeats, the more accurately the global contention counter reflects current network contention in the operational group. Each update, however, consumes computational overhead.

Because an update of all values of all local contention counters is computationally burdensome, as an alternative, maintaining (610) a global contention counter (616) in the method of FIG. 7 may include updating (624) at a predefined period of time (620) the global contention counter (616) with only values of local contention counters (608) that have changed since a previous update. In many cases some elements of each of the local contention counters may remain unchanged between heartbeats. The amount of computational overhead required in updating the global contention counter may be reduced by performing a lightweight update including only values of local contention counters that have changed since a previous update. Updating (624) the global contention counter with only values of local contention counters that have changed since a previous update may be carried out by identifying in a local contention a flag indicating that at least one value of the local contention counter has changed since a previous update. The network contention module, in addition to incrementing values associated with links in the path, may also set a flag representing a change in local contention counter when injecting packets onto links in a path. After every update, the flag is reset.

Exemplary embodiments of the present invention are described largely in the context of a fully functional computer system for tracking network contention. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernet™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of tracking network contention on links among compute nodes of an operational group in a point-to-point data communications network of a parallel computer, each compute node connected to an adjacent compute node in the point-to-point data communications network through a link, the method comprising:

maintaining, by a network contention module executing at run time on each compute node in the operational group, a local contention counter for each compute node, each local contention counter representing network contention on links among the compute nodes originating from a compute node; and maintaining a global contention counter, the global contention counter representing network contention currently on all links among the compute nodes in the operational group, wherein maintaining a global contention counter further comprises:

summing, in the global contention counter, all current values of each local contention counter for each compute node in the operational group; and distributing the global contention counter to all compute nodes in the operational group.

2. The method of claim 1 wherein maintaining a local contention counter for each compute node further comprises:

establishing upon execution of an application in the operational group the local contention counter for each compute node including initializing values of the local contention counter for each compute node to zero.

3. An apparatus for tracking network contention on links among compute nodes of an operational group in a point-to-point data communications network of a parallel computer, each compute node connected to an adjacent compute node in the point-to-point data communications network through a link, the apparatus comprising a computer processor, a computer memory operatively coupled to the computer processor, the computer memory having disposed within it computer program instructions, when executed by the computer processor, capable of:

maintaining, by a network contention module executing at run time on each compute node in the operational group, a local contention counter for each compute node, each local contention counter representing network contention on links among the compute nodes originating from a compute node; and maintaining a global contention counter, the global contention counter representing network contention currently on all links among the compute nodes in the operational group, maintaining a global contention counter, the global contention counter representing network contention currently on all links among the compute nodes in the operational group, wherein maintaining a global contention counter further comprises:

summing, in the global contention counter, all current values of each local contention counter for each compute node in the operational group; and distributing the global contention counter to all compute nodes in the operational group.

4. The apparatus of claim 3 wherein maintaining a local contention counter for each compute node further comprises:

establishing upon execution of an application in the operational group the local contention counter for each compute node including initializing values of the local contention counter for each compute node to zero.

5. A computer program product for tracking network contention on links among compute nodes of an operational group in a point-to-point data communications network of a parallel computer, each compute node connected to an adjacent compute node in the point-to-point data communications network through a link, the computer program product disposed in a non-transitory computer readable storage medium, the computer program product comprising computer program instructions, when executed by a computer processor, capable of:

maintaining, by a network contention module on each compute node in the operational group, a local contention counter for each compute node, each local contention counter representing network contention on links among the compute nodes originating from a compute node; and maintaining a global contention counter, the global contention counter representing network contention currently on all links among the compute nodes in the operational group, wherein maintaining a global contention counter further comprises:

summing, in the global contention counter, all current values of each local contention counter for each compute node in the operational group; and distributing the global contention counter to all compute nodes in the operational group.

6. The computer program product of claim 5 wherein maintaining a local contention counter for each compute node further comprises:

establishing upon execution of an application in the operational group the local contention counter for each compute node including initializing values of the local contention counter for each compute node to zero.

7. The computer program product of claim 5 wherein the computer readable storage medium comprises a recordable medium.

* * * * *